US006021312A

United States Patent [19]
Klein

[11] Patent Number: 6,021,312
[45] Date of Patent: Feb. 1, 2000

[54] ALPHANUMERIC RADIO PAGER WITH MULTILINE DISPLAY AND SYSTEM OR MESSAGE SELECTIVE ZOOM WITH HORIZONTAL SCROLLING

[75] Inventor: Thomas Klein, Freemont, Calif.

[73] Assignee: Philips Consumer Communications, LP, New York, N.Y.

[21] Appl. No.: 09/119,571

[22] Filed: Jul. 20, 1998

[51] Int. Cl.[7] .......... H04Q 7/14

[52] U.S. Cl. .......... 455/38.1; 455/33.1; 340/825.44

[58] Field of Search .......... 455/38.1, 31.2; 390/825.44, 311.1; 364/919.5, 927.2, 928, 928.2, 935.1, 937, 940.81, 946.2, 947, 947.2, 948.21, 965; 340/825.47, 825.52; 370/310, 312, 313, 314

[56] References Cited

U.S. PATENT DOCUMENTS 5,182,553 1/1993 Kung .......... 340/825.44
5,473,667 12/1995 Neustein .......... 455/31.2
5,784,000 7/1998 Sato .......... 340/825.44

FOREIGN PATENT DOCUMENTS 2086106 5/1982 United Kingdom .

OTHER PUBLICATIONS

Skytel Corporation, "SKWORD: Nationwide Text Messaging", May 1994.

*Primary Examiner*—William Cumming
*Attorney, Agent, or Firm*—Jack D. Slobod

[57] ABSTRACT

A radio pager device includes a display having a zoomed-out multiline mode and a zoomed-in single line mode for display of at least a portion of a series of characters at a time extracted from a message having an address or identification code which is among those from which the pager is authorized to extract message data. The zoom mode is selectable on either a system basis, by default, or a message basis. The message specific zoom mode is determined by accessing display per address information stored in volatile memory and programmable by the user. In the single line mode, continuous horizontal character by character scrolling may be selected by the user and controlled by key actuation to toggle between a stationary paused state and a continuously scrolling state.

5 Claims, 3 Drawing Sheets

ALPHANUMERIC RADIO PAGER WITH MULTILINE DISPLAY AND SYSTEM OR MESSAGE SELECTIVE ZOOM WITH HORIZONTAL SCROLLING

BACKGROUND OF THE INVENTION

1. Field of the Invention

The present invention relates to a device, such as a radio pager, for receiving, demodulating and decoding wireless broadcast messages including a series of characters from a predetermined character set, and displaying the message as a few lines on a display. The present invention also relates to such a device wherein messages of different types are broadcast and the device is programmed to recognize one or more addresses or identification codes in extracting message data.

2. Description of the Related Art

Radio pagers presently in use have multi-line LCD displays for received text or alphanumeric numeric messages, which displays have a fixed small number of lines, typically two to four lines, each with a fixed width of about 15 to 20 characters. The messages can vary over a wide range in length, ranging from those which fit on one line, such as a telephone number or a stock quote, to long data messages of up to for example 6,400 characters. When a received message contains more characters than can be displayed simultaneously, the message can be advanced line by line to achieve a vertical scrolling of the message.

Further, pagers may receive a plurality of different types of messages as a result of being preprogrammed with a plurality of respective different addresses or identification codes used to extract messages. Typically, the different addresses include an individual address for messages directed exclusively to the specific pager, and thereby to the individual user thereof, one or more group addresses for messages directed to a group of pagers or users, and one or more mail-drop addresses for subscription services of messages pertaining to news, sports, weather, stocks, etc, respectively.

The inventor herein has become aware that users frequently have difficulty in reading displayed messages on a multiline display of a modern pager, due to the relatively small size of the characters.

While the concepts of zooming and panning a display are well known for computer graphics displays, and have also been suggested for personal communicators including graphics displays (see e.g. U.S. Pat. No. 5,615,384 to Allard et al.), such concepts are not generally applicable to radio pagers of a type having only a few lines of display for characters.

SUMMARY OF THE INVENTION

It is an object of the present invention to improve the readability of displayed messages on radio pager having a multiline display mode by providing for a zoom function in which the displayed characters are increased in size either selectively or in dependence on the message, albeit that pixels of the display for display of the message are reorganized into a single line of characters having fewer characters per line than in the multiline mode.

It is a further object of the present invention to provide display control means for advancement of the displayed portion of a long message in a manner which improves readability.

It is yet another object of the present invention to provide a radio pager in which a zoom display mode or other display modes for displaying message data are settable either on a system basis or on a message basis.

Briefly, the aforementioned and other objects are satisfied by providing a radio pager device including means for controlling the display of the pager device to display a series of characters extracted from a received, demodulated and decoded message, wherein the display controlling means is configured for causing selective display of at least a portion of the extracted series of characters at a time in either a multiline mode or a single line mode. In accordance with one aspect of the present invention, the display controlling means is configured for selective horizontal character by character scrolling of the displayed portion of the extracted series of characters under the control of a user when displayed in a single line mode. Preferably, the user control of horizontal character by character scrolling includes start/continue and pause control.

In accordance with other aspects of the invention the display may be selectively placed by the user in the one-line mode or the multiline mode on a system basis, and/or the mode used to display a message may be adapted automatically in dependence on the nature or source of the message. In order to provide for such automatic adaption of display mode on a message basis, the usual memory means for storing a plurality of different addresses or identification codes with respect to which the pager is authorized to extract associated message data, also stores message configuration information indicating display modes in correspondence with the different addresses or identification codes, and the display controlling means is configured for causing selective display of the extracted message data in a display mode selected in dependence upon the stored message configuration information associated with the address or identification information corresponding to the message containing the message data. In this way, the zoom display mode, or other display mode such as font or character set, can be selected in dependence on the stored message configuration information, allowing for an optimum display mode based upon the source or nature of the message.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1A:
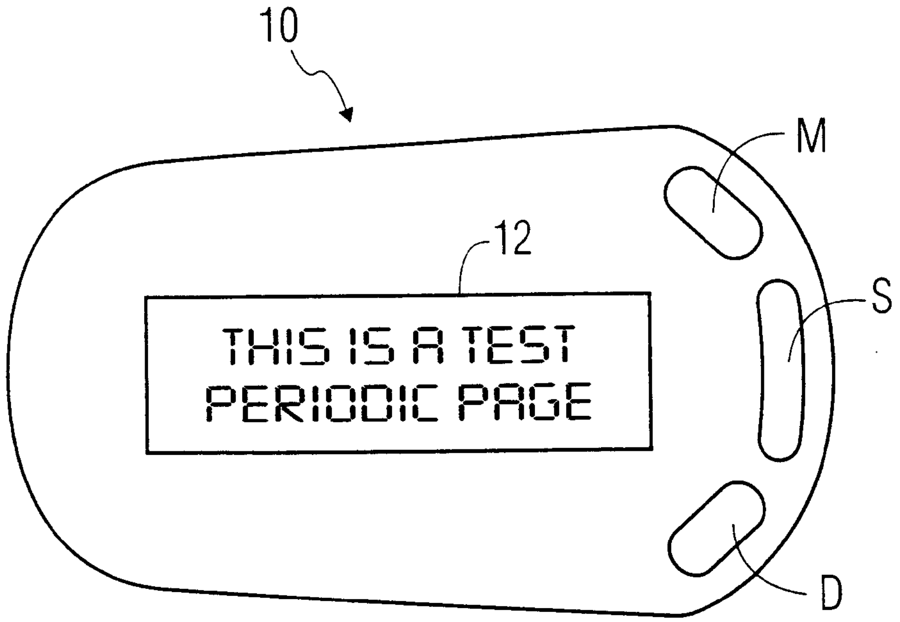
FIG. 1A is a simplified front view of a radio pager in accordance with the present invention including a display showing an illustrative message in a multiline display mode.
Figure 1B:
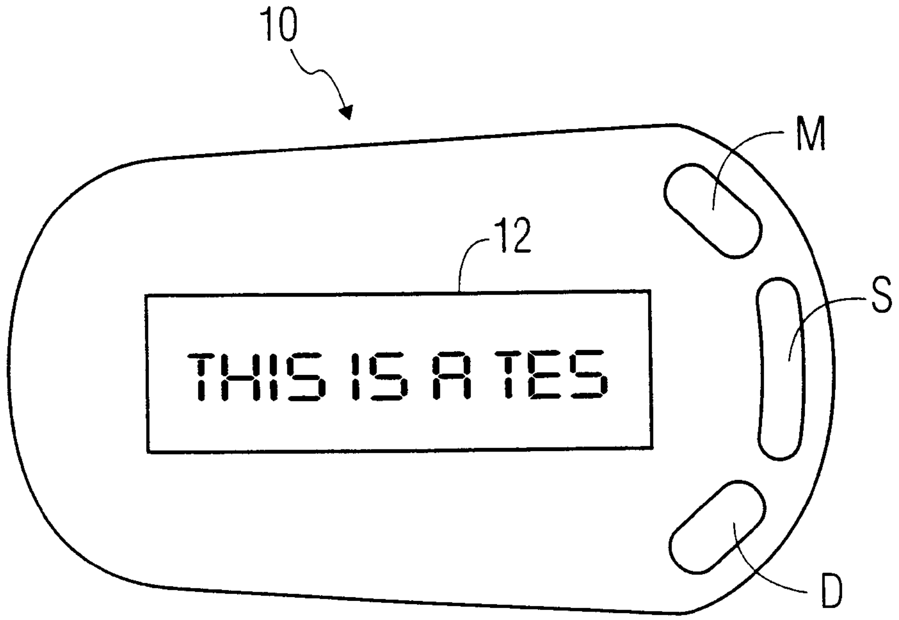
FIG. 1B is a front view of the radio pager which is similar to FIG. 1A except that the display is in a single line display mode and shows a beginning portion of the illustrative message.

Referring first to FIGS. 1A and 1B of the drawing, a multiline alphanumeric radio pager 10 in accordance with present invention is shown including a rectangular LCD bit mapped display of suitable size and number of pixels consistent with the intended display modes and character sizes. For example, where both two line and single line modes are possible, an illustrative size of display 12 is 1.5 cm high by 4.0 cm wide and about 45 pixels high by 120 pixels wide. Where the multiline mode is more than two lines, such as three or four lines, the height of display 12 would be larger in both dimension and number of pixels. Also shown are a "menu" key M, "select" key S and "do" key D or other suitable assortment of keys provided for the user to actuate in setting user configurable or settable data, features or modes of pager 10, including the display mode, and also used to recall pages or messages and manipulate the view thereof as shown on display 12. Such manipulation of the view includes selectively advancing or scrolling a message which is too long to be seen at one time in the current display mode. Display 12 also typically shows icons (not shown) indicative of the status or number of messages, or which serve as changeable or highlightable objects providing visual feedback when manipulating the aforementioned keys.

In the two line mode shown in FIG. 1A, when a monospace font is employed, each character may be 7 pixels high by 5 pixels wide with a one pixel wide separator between adjoining characters and at least a one pixel high separator between adjoining lines. A proportional font could also be employed, in which case the case the indicated character size pertains to the widest characters thereof. Further, for appropriate readability, the text of the message is formatted such that words are not split between lines. If the message were longer than could be displayed simultaneously, the displayed message could be advanced or vertically scrolled two lines at a time in a conventional manner using an appropriate key or key sequence.

In the single line or zoom mode shown in FIG. 1B, the characters are larger in both horizontal and vertical dimension than in the two line mode, for example 10 pixels high by 7 pixels wide or 14 pixels high by 10 pixels wide for a monospace font, but the horizontal separators between adjoining characters are preferably maintained at one pixel wide. As will become clearer from the later discussion, in the single line mode either horizontal character by character scrolling or vertical line by line scrolling may be selectively employed to advance a message which is longer than can be displayed at one time. When horizontal scrolling is employed, partial words may at times appear at either or both ends of a line, as illustrated in FIG. 1B, but the result is readable since the scrolling is done at a steady user selectable rate.

Figure 2:
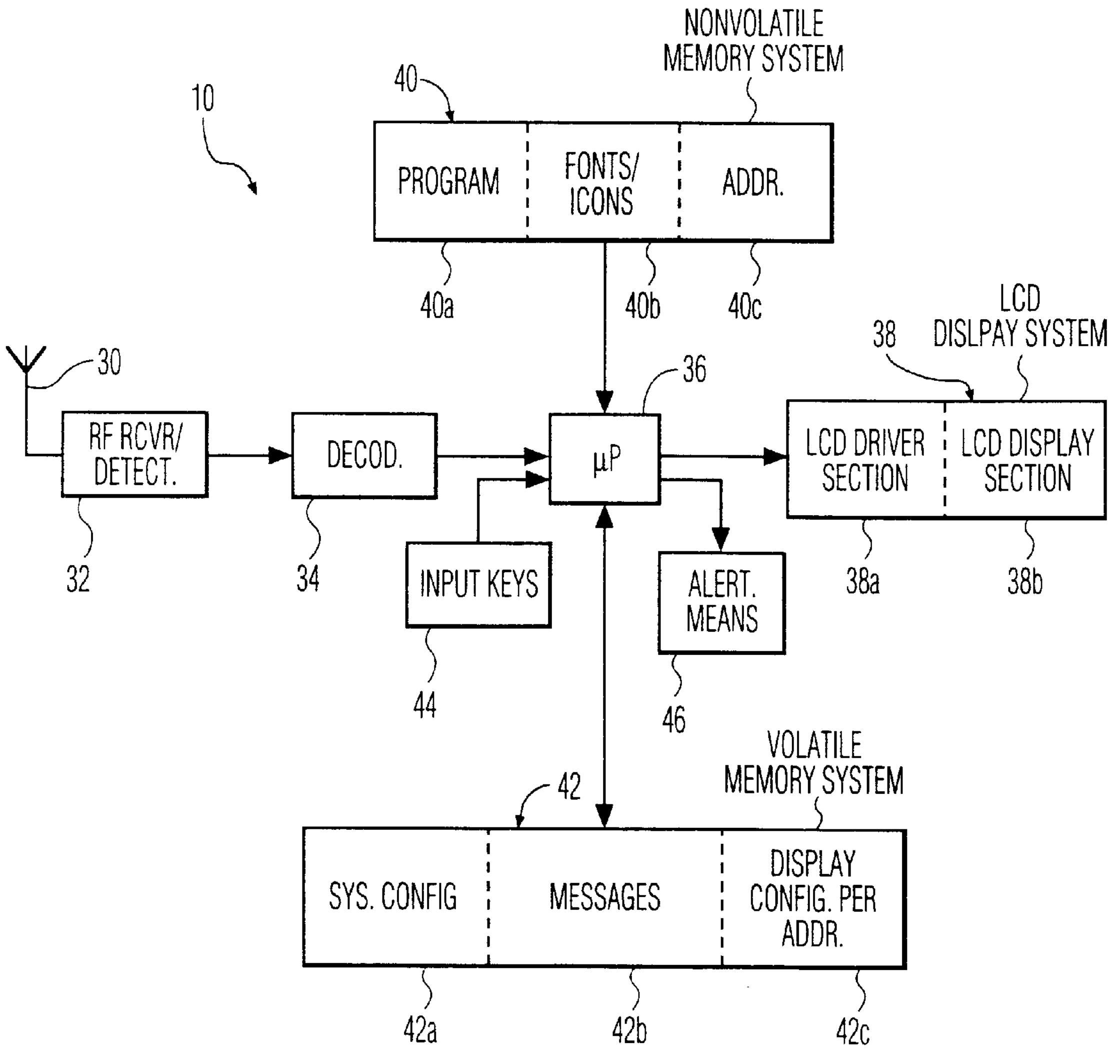
FIG. 2 is a schematic block diagram of the circuitry of radio pager of the present invention.

The internal circuitry of pager 10 is shown in FIG. 2, and includes an RF receiver and detector section 32 which receives broadcast RF paging signals from antenna 30 in a predetermined standard frequency band. The received paging signals, which are formatted in accordance with a predetermined paging protocol, e.g. FLEX (a trademark of Motorola) or APOC, are decoded in decoder 34, and provided to microprocessor 36 as pages. Microprocessor 36 provides a bitmap to LCD driver section 38*a* of LCD display system 38 which controls LCD display section to display alphanumeric characters and/or icons indicative of messages or pages, configuration states of pager 10, or other data such as the time, alarms or canned messages.

As is conventional, the pages include address or identification code portions which the microprocessor examines to determine if the page is intended for pager 10 or the pager has the right to extract the message data therein, by comparing them to addresses or identification codes stored generally in section 40*c* of nonvolatile memory system 40 which microprocessor 36 has read only access to. Memory section 40*c* is typically implemented as an EEPROM so that the addresses or identification codes can be programmed therein when the pager is issued to the user. Nonvolatile memory system 40 further includes a section 40*a* for the programs and program related data used by the microprocessor, and a section 40*b* for font and icon data indicating for a fundamental rectangular array of pixels making up each particular character or icon, which pixels are black and which are white. Canned messages (not shown) may also be stored in nonvolatile memory system 40. Memory system sections 40*a* and 40*b* are typically implemented as ROMs, the programs and data stored therein constituting firmware.

In determining whether pager 10 has authority to extract a received, detected and decoded message, microprocessor 36 examines message fields specifically provided for addresses or identification codes, as well as data in extended address fields or predetermined message data fields in accordance with the particular standard paging protocol utilized. The addresses or identification codes of messages which the pager 10 has access rights to include at least one or more assigned to pager 10 exclusively, possibly one or more for messages directed to a group of pagers or users, and possibly one or more for mail-drop subscription services of messages pertaining to news, sports, weather, stocks, etc, respectively, which are essential assigned to the information provider.

Microprocessor 36 has read/write access to a volatile memory system or RAM 42, which includes a section 42*a* for system configuration data indicating among other things the instantaneous system configuration states of pager 10, a section 42*b* for message data extracted by microprocessor 36 from received, detected and demodulated messages which it determines pager 10 has the right to extract, and also a section 42*c* which contains a table indicating on an address by address basis, the display configuration to be used for message data contained in messages having that address. The message specific display configuration includes notably whether or not the display is to be zoomed, i.e. whether multiline or single line mode is to be used, and may include other information, such as the particular font or character set to be used.

The microprocessor also receives input from keys 44, which refers collectively to "menu" key M, "select" key S, and "do" key D, and controls a conventional alert means 46 including flashing light (not shown), speaker (not shown) as for producing a beeping noise, and vibrator (not shown) which are selectively used to alert the user to a received message or a programmed alarm, in dependence on the instantaneous system configuration states indicated by the data stored in memory section 42*a*.

Figure 3:
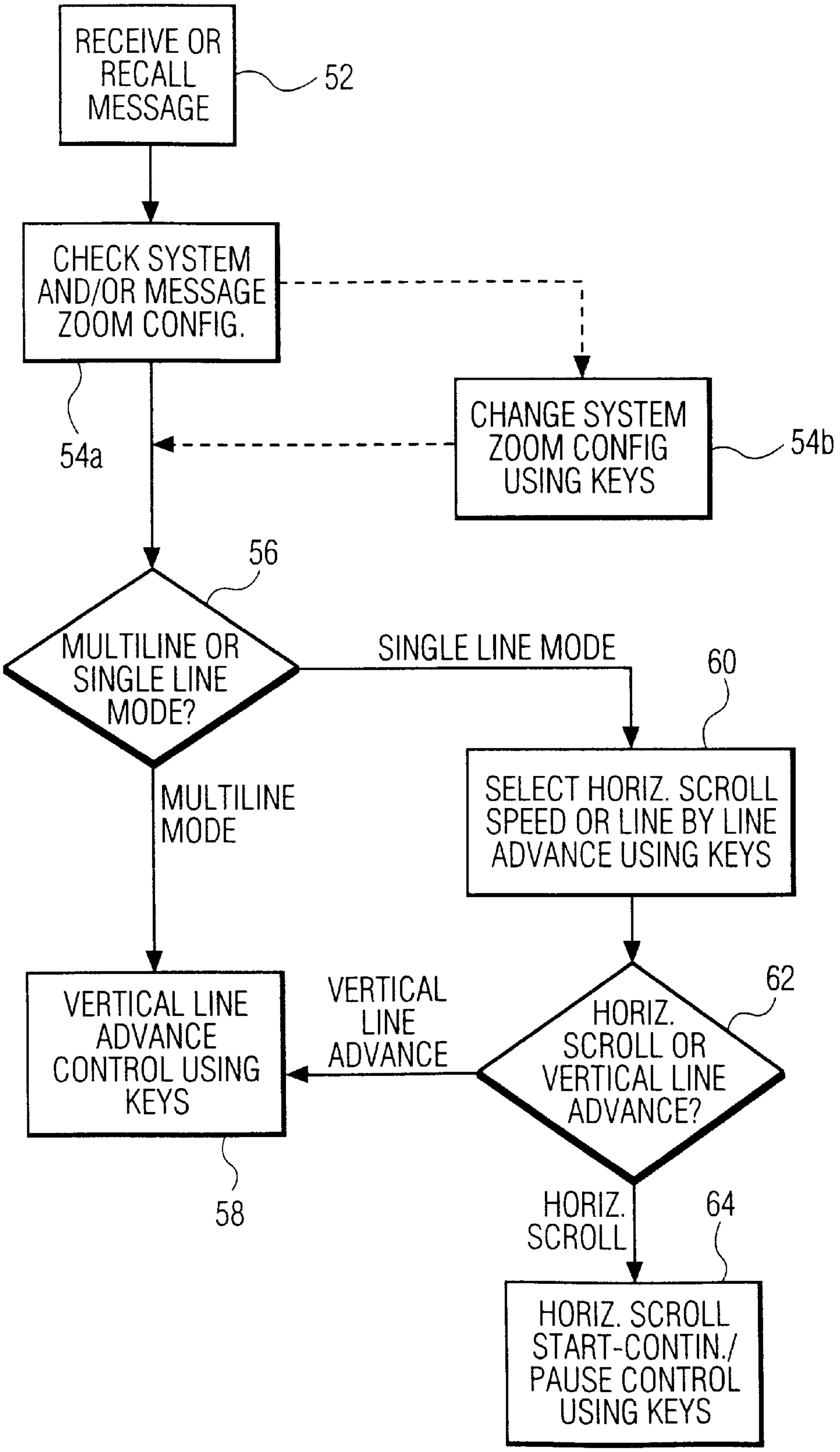
FIG. 3 is flow chart pertaining to control of the display of a message on the pager carried out by the pager circuitry shown in FIG. 2.

The operation of pager 10 in relation to the selection of a zoom state for displaying a message will be best understood with reference to the flowchart shown in FIG. 3, which indicates steps performed by microprocessor 36 under program control. Therein, firstly in step 52 a message or page is received or a desired message or page number is recalled from memory section 42*b* by suitable manipulation of at least on of keys 44, in particular "do" key D. Then, in step 54*a*, memory section 42*a* is checked to determine the system display configuration, and memory section 42*b* is checked using the address or identification information of the message from which the message data was extracted as an index to determine if there is a stored display configuration therefor. The system display configuration is utilized as a default unless a message specific display configuration is stored in memory section 42*c* for the address or identification code associated with the particular address, in which case the message specific display configuration is used. Further, the system display configuration may be changed by the user at any time in step 54*b* utilizing keys 44. An illustrative manipulation of keys 44 for such purpose include actuation of "menu" key M until a "ZOOM IN/OUT" display appears with icons such as "+" and "−" indicating zoom in or out direction which icons are selectable in response to actuation of the "select" key, and then actuation of the "do" key with respect to the selected zoom direction.

Execution of the display control procedure branches at step 56 in dependence on whether the multiline mode or single line mode for a particular message has been determined in the preceding steps 54*a*, 54*b* on a system basis by default, or based upon the message. When the multiline mode is to be used, then step 58 is reached wherein to view a long message vertical line advance is implemented in response to user actuation of one or more of keys 44, such as "do" key D. Preferably, for good readability, in response to each actuation of "do" key D the message is instantaneously advanced by as many lines as there are on the display. If desired, an advance of the message by a single line may be implemented in response to each actuation of one of keys 44 to achieve a vertical scrolling effect.

When, on the other hand, the single line mode is to be used, execution of the procedure branches from step 56 to a step 60 wherein either a horizontal scroll speed is selected or line by line vertical advance is selected. The selection is made by appropriate manipulation of keys 44. For example, actuation of the "menu" key may cause the display of a "SCROLL SPEED" menu including icons representing slow, medium or fast continuous horizontal character by character scrolling, or line by line vertical advance. The icons are navigated between by actuation of the "select" key S, and a selected icon corresponding to a desired horizontal scrolling speed or to vertical line by line advance is chosen by actuation of the "do" key D.

Execution of the display control procedure branches in dependence upon whether a horizontal scrolling speed or vertical line by line advance has been selected in step 60 for the single line mode. If line by line advance has been chosen, then step 58 is reached where the message is caused to advance instantaneously by one line in response to each actuation of a particular one of keys 44, specifically the "do" key. If however a horizontal scrolling speed has been chosen in step 60, then the branching causes step 64 to be reached in which continuous horizontal character by character scrolling at the chosen speed is controlled in response to actuation of one or more of keys 44. Preferably, a toggle between a stationary paused state and a horizontal scrolling state of the displayed message is implemented in response to sequential actuations of a single one of keys 44, such as the "do" key D. Thus pressing "do" key D when the message is in a stationary paused state causes horizontal scrolling to start or begin, whereas pressing "do" key D when the message is scrolling continuously horizontally at the chosen speed will pause the horizontal scrolling so that a displayed portion of the message is stationary.

Memory section 42*c* is preferably programmable by the user by a procedure employing key actuations and menus similar to those used in step 54*b* after cycling through each different source type of message in response to actuation of an appropriate one or more of keys 44. Alternatively, the zoom configuration for each address may be programmed into nonvolatile memory system 40 when authorized addresses or identification codes are programmed therein.

It should be appreciated that the objects of the present invention have been satisfied by providing a pager whose display configuration can be chosen on a system or message basis.

While the present invention has been described in particular detail, it should also be appreciated that numerous modifications are possible within the intended spirit and scope of the invention. For example, the specific display configuration for particular messages may be stored with or appended to the messages.

What is claimed is:

1. A radio pager device comprising:

means for receiving and demodulating an RF signal, and for decoding messages from the received and demodulated RF signal, which messages contain at least one address or identification code and associated message data corresponding to a series of characters to be displayed;

memory means for storing one or more addresses or identification codes with respect to which the pager is authorized to extract associated message data; and means for extracting from the decoded messages the series of characters corresponding to message data associated with the stored addresses or identification codes;

a display means having a multiline mode and a single line mode for display of at least a portion of the series of characters at a time; and means for controlling said display means to display the series of characters extracted from a message;

wherein said display controlling means is configured for causing selective display of at least a portion of the extracted series of characters at a time in either said multiline mode or said single line mode, and for selective horizontal character by character scrolling of the displayed portion of the extracted series of characters under the control of a user when displayed in a single line mode.

2. The device as claimed in claim 1, wherein said memory means is for storing a plurality of different addresses or identification codes with respect to which the pager is authorized to extract associated message data, and for storing message configuration information indicating respective multiline or single line display modes corresponding with said different addresses or identification codes, and wherein said display controlling means is configured for causing selective display of the extracted message data in either said multiline mode or said single line mode, in dependence upon the stored message configuration information corresponding to the address or identification code of the message containing the extracted message data.

3. The device as claimed in claim 1, wherein said user control of horizontal character by character scrolling includes start/continue and pause functions.

4. The device as claimed in claim 2, wherein said user control of horizontal character by character scrolling includes a single key toggling between start/continue and pause functions.

5. A radio pager device comprising:

means for receiving and demodulating an RF signal, and for decoding messages from the received and demodulated RF signal, which messages contain at least one address or identification code and associated message data corresponding to a series of characters to be displayed;

memory means for storing one or more addresses or identification codes with respect to which the pager is authorized to extract associated message data; and means for extracting from the decoded messages the series of characters corresponding to message data associated with the stored addresses or identification codes;

a display means having a plurality of different display modes for display of at least a portion of the series of characters at a time, each display mode providing a different appearance of a displayed series of characters; and means for controlling said display means to display the series of characters extracted from a message;

wherein said memory means is for storing a plurality of different addresses or identification codes with respect to which the pager is authorized to extract associated message data, and for storing message configuration information indicating respective display modes in correspondence with said different addresses or identification codes, and wherein said display controlling means is configured for causing selective display of the extracted message data in a display mode selected in dependence upon the stored message configuration information associated with the address or identification code of the message containing the extracted message data.

* * * * *